United States Patent [19]

Koken et al.

[11] Patent Number: 4,672,598
[45] Date of Patent: Jun. 9, 1987

[54] DISC LOADING MECHANISM

[75] Inventors: Karel G. M. Koken; Hubertus F. W. van de Kerkhof, both of Eindhoven, Netherlands

[73] Assignee: U.S. Philips Corporation

[21] Appl. No.: 617,067

[22] Filed: Jun. 4, 1984

[30] Foreign Application Priority Data

Jun. 15, 1983 [NL] Netherlands ............. 8302129

[51] Int. Cl.$^4$ ............................................. G11B 17/04
[52] U.S. Cl. .................................................. 369/75.2
[58] Field of Search .............................. 369/75.2, 77.1

[56] References Cited

U.S. PATENT DOCUMENTS

| 3,811,686 | 5/1974 | Watanabe | 369/75.2 |
| 4,337,533 | 6/1982 | Ando et al. | 369/77.1 |
| 4,439,850 | 3/1984 | Takahara et al. | 369/75.2 |

FOREIGN PATENT DOCUMENTS 56-58167  5/1981  Japan ...................... 369/75.2

Primary Examiner—Steven L. Stephan
Attorney, Agent, or Firm—F. Brice Faller

[57] ABSTRACT

In an apparatus for recording and/or reproducing signals on an information carrier comprising a loading mechanism for loading the information carrier (21, 85), a drawer (10, 76) is provided, which is rectilinearly retractable and extensible between an opened and a closed position which carries a platform (24, 86). The drawer (10, 76) has in side walls (15, 16, 81), viewed in the inward direction, upwardly extending guiding grooves or slots (27, 82, 83) in which the platform (24, 86) is guided so as to be movable in the direction of height with respect to the drawer (10, 76) between an upper and a lower position. The platform (24, 86) is moved during a first part of the inward movement over the horizontally arranged surface (33a, 79a) of at least one positioning element (33, 79) and is held in the grooves or slots (27, 82, 83) at the level of the upper position and is then urged during a second part of the inward movement against at least one fixedly arranged upwardly directed stop (35, 101), then moves in the grooves or slots (27, 82, 83) down the stop (35, 101) in a direction substantially perpendicular to the supporting means (20, 102) for the information carrier to the lower position.

17 Claims, 11 Drawing Figures

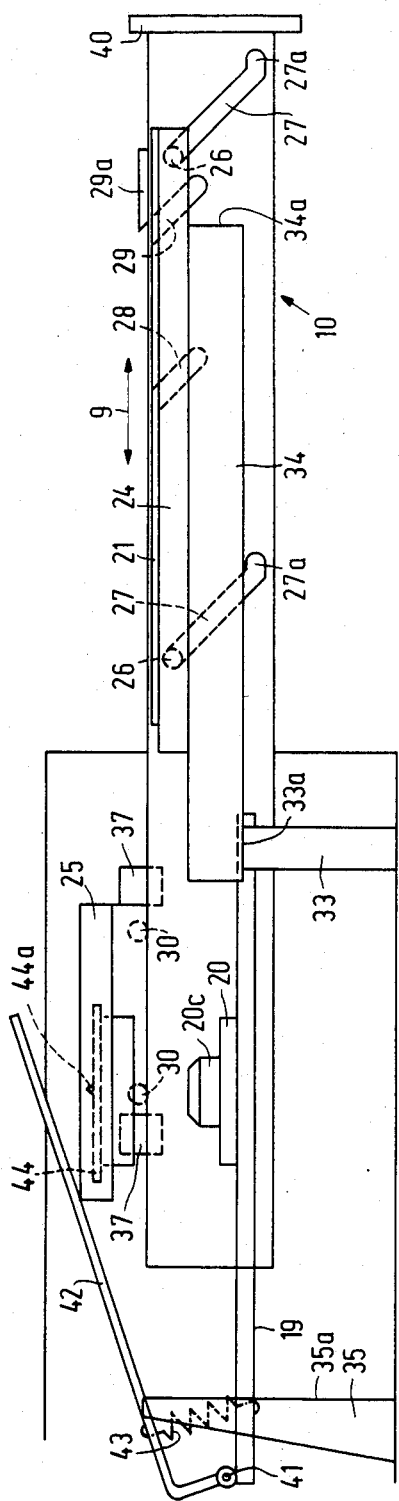
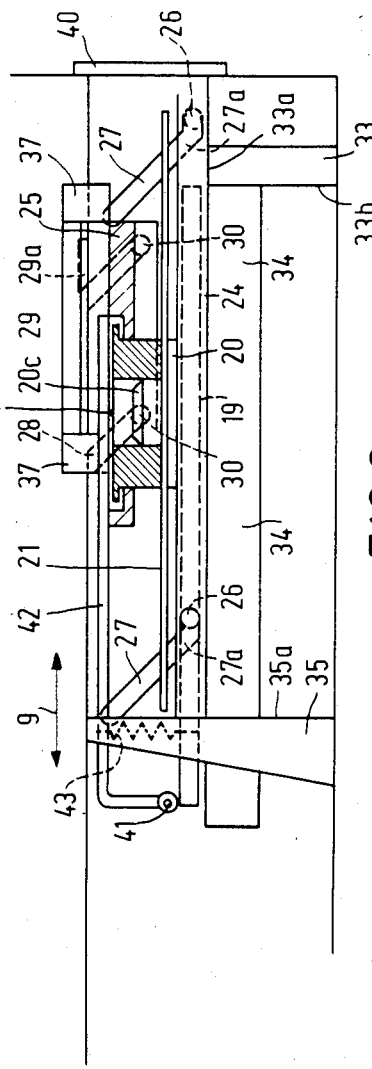
FIG.5
FIG.6

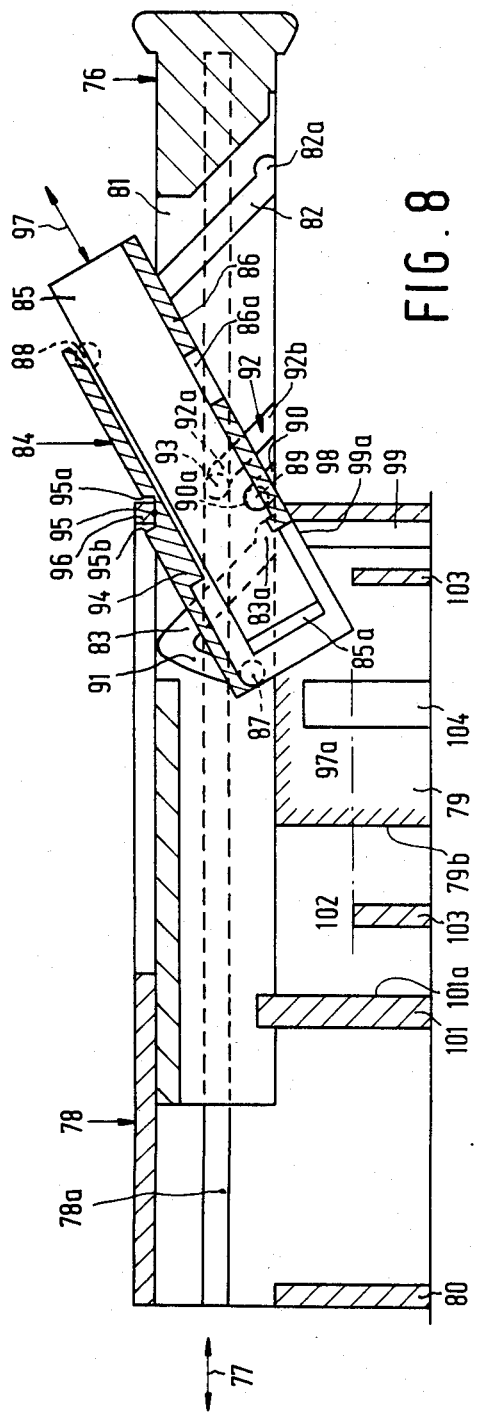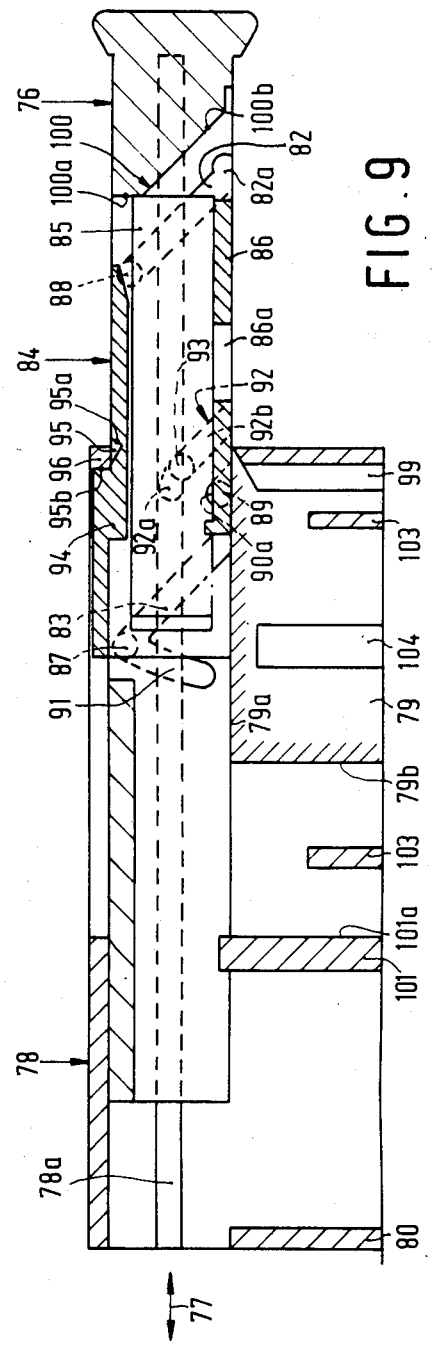

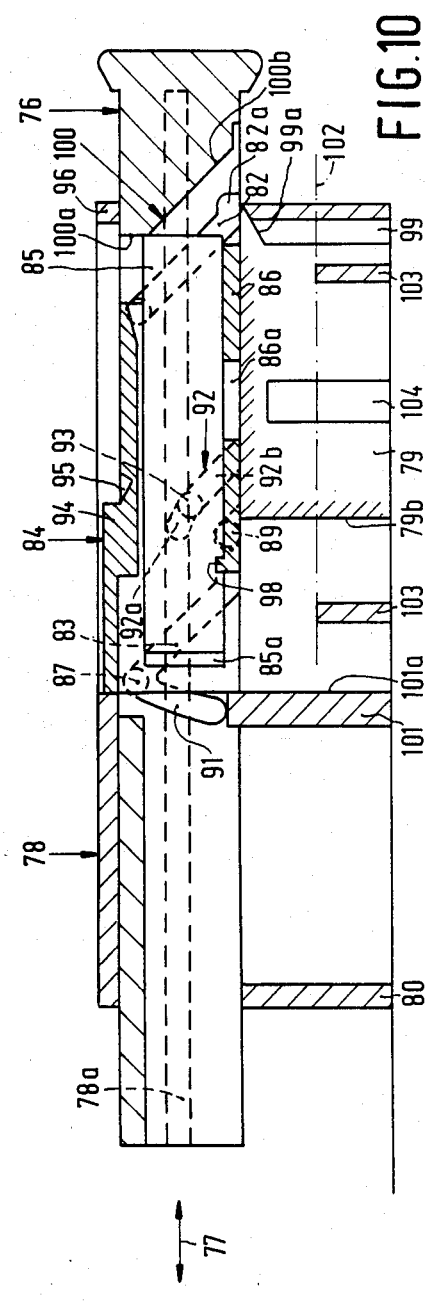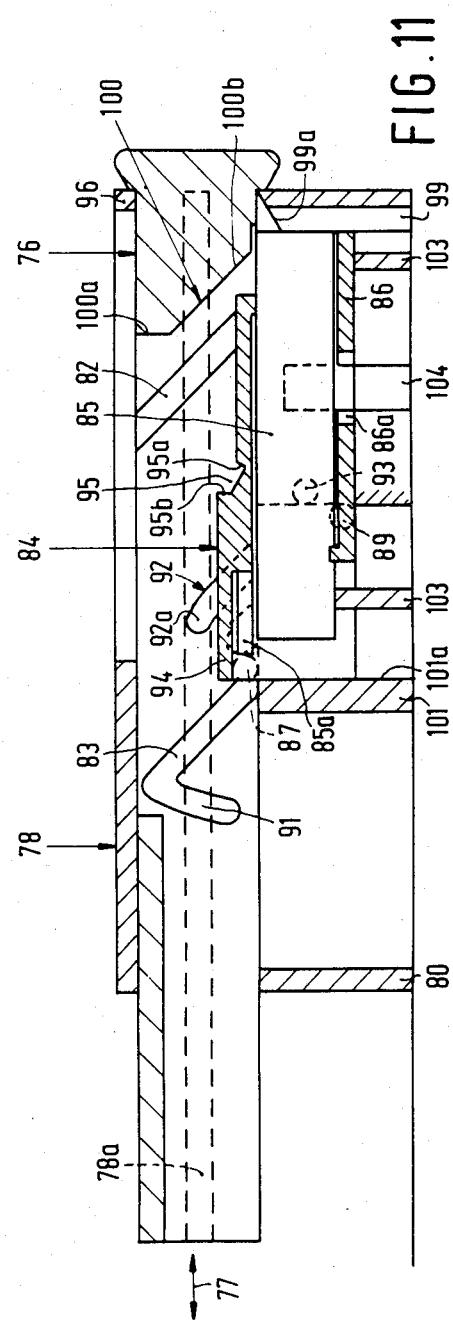

DISC LOADING MECHANISM

BACKGROUND OF THE INVENTION

The invention relates to an apparatus for recording and/or reproducing signals on an information carrier provided with a loading mechanism for loading the information carrier onto supporting means of the apparatus, the apparatus having a housing and a frame which occupies a fixed position in the housing and carries the supporting means for the information carrier. The loading mechanism comprises a drawer which is linearly insertable and extensible through a front opening in the housing between an extended and an inserted position and which carries a platform for carrying the information carrier to the supporting means, the loading mechanism having grooves or slots which extend obliquely with respect to the inward direction to move the platform between an upper and a lower position. During the movement to the lower position a fixedly arranged stop guides the platform in a downward direction with respect to the supporting means and the information carrier is located on the supporting means in the lower position of the platform.

U.S. Pat. No. 4,272,794 discloses a record player intended for disk-shaped information carriers or discs which are inserted into the loading mechanism on the front side of the apparatus. The drawer, whose bottom constitutes the platform on which the disk is disposed, is then inserted into a subframe, in which the grooves or slots are present. The subframe can perform both a horizontal and a downward movement with respect to the supporting means, constituted by a turntable, through the grooves or slots, for which purpose the subframe is provided with an actuation arm, located outside the housing. However, the subframe cannot be displaced until the preceding step of inserting the drawer has been fully accomplished, which results in that during loading of the disk always two separate operations should be carried out. Furthermore, the adjustment of the stop is such that the platform during the insertion should be slightly tilted, as a result of which during lowering onto the supporting means an oppositely directed tilting movement of the platform is required to be able to position the disk accurately on the supporting means. These movements should be accurately controlled in the loading mechanism and are liable to lead to disturbances. Moreover, these tilting movements may be undesirable if the supporting means are provided, for example, with a centering mandrel projecting above them over a certain axial height.

SUMMARY OF THE INVENTION

The invention has for its object to construct such an apparatus so that the inward movement and the outward movement of the platform with the information carrier can take place as a continuous movement by means of a simple reliably operating loading mechanism.

The invention is characterized in that the drawer has in side walls guiding grooves or slots which extend upwardly in the inward direction of the drawer and in that the platform is movably arranged in the guiding grooves or slots with respect to the drawer. During a first part of the inward movement of the drawer the platform slides on a horizontal surface of at least one fixedly arranged positioning element and is held thereby at the level of the upper position in the guiding grooves or slots, whereupon the platform, sliding off the horizontal surface of the positioning element, abuts the stop during the second part of the inward movement and moves in the guiding grooves or slots down the stop in a direction substantially perpendicular to the supporting means to the lower position.

Thus, after the information carrier has been provided on the platform, the information carrier is carried to the supporting means by merely inserting the drawer, which is effected during one continuous horizontal movement of the drawer. This movement of the drawer ensures automatically that, after the positioning element is passed in that the platform slides down the stop, the platform moves perpendicular angles to the supporting means. This vertical movement of the platform offers the advantage that in the presence of parts, such as a centering pin or a driving shaft, projecting upwards with respect to the supporting surface of the supporting means, the information carrier can be moved over these parts in accurately prepositioned condition. The drawer of the loading mechanism can be of compact construction in dimensions of width and height, which offers an advantage for the front of the housing which due to the comparatively small dimensions of the drawer offers much space for accommodating control members and other members of the apparatus, such as displays. When the loading mechanism is manufactured, for example, by injection-moulding from synthetic material, the additional advantage is obtained that it comprises only a minimum number of component parts and is particularly suitable for mass production. The apparatus can be in the form of a record player, such as a so-called compact disk player, in which event the information carrier is disk-shaped and the supporting means are in the form of a turntable, but it may also be a magnetic tape cassette apparatus, in which event an information carrier located in a cassette is used, the cassette then being placed on the platform.

A preferred embodiment of an apparatus according to the invention is characterized in that the positioning element comprises besides the horizontal surface also an adjoining upright abutment surface which the platform abuts during a first part of the outward movement of the drawer, the platform is moved substantially perpendicular to the supporting means by cooperation with the guiding grooves or slots to the upper position, after which the platform during a second part of the outward movement of the drawer slides on the horizontal surface of the positioning element. These measures provide the possibility that during the removal of the information carrier from the supporting means, the latter can move in vertical direction upwards and can then be extended, which movements take place in one continuous outward movement of the drawer. The loading mechanism of the apparatus according to the invention can be used advantageously for controlling a pressure member for urging the information carrier against the supporting means. In this case, the apparatus is characterized in that the pressure member is located on a pressure arm which cooperates only during the second part of the inward movement with further grooves or losts in the side walls of the drawer to perform a downward movement in these grooves or slots for causing the pressure member to move towards the supporting means. A further preferred embodiment of an apparatus according to the invention is characterized in that for the platform and for the pressure arm separate guiding grooves or slots are provided in the side walls of the drawer, adjacent the upper ends of the grooves or slots, for the pressure arm means are provdied on said side walls which, during the second part of the inward movement of the drawer, cooperate with projections on the pressure arm to guide them into the grooves or slots. This arrangement provides a separate control of the pressure arm, as a result of which the pressure arm can perform a movement relative to the platform.

In this connection, a preferred embodiment of an apparatus according to the invention is characterized in that the grooves or slots for the pressure arm extend rectilinearly throughout their lengths and in the guiding grooves or slots for the platform have parts at their lower ends which extend substantially parallel to the supporting means, the arrangement being such that when the platform cooperates with the lower end parts of the guiding grooves or slots during the first part of the outward movement and the second part of the inward movement of the drawer the pressure arm performs an upward movement and a downward movement respectively and the platform remains stationary. Thus, when the platform cooperates with the lower end parts of the guiding grooves or slots both during the inward movement and during the outward movement of the drawer there is a time difference between the movement of the pressure arm and the movement of the platform, such that during the inward movement of the drawer, when the information carrier has been positioned on the supporting means, the information carrier can be urged against the supporting means, and during the outward movement of the drawer the information carrier, without being impeded by the pressure member, can be lifted off the supporting means by the platform.

Another preferred embodiment of an apparatus according to the invention is characterized in that the pressure arm is guided between fixedly arranged guides in a direction substantially perpendicular to the supporting means. This results in the pressure member also being lowered at least substantially perpendicularly on the supporting means, which is desirable for a satisfactory pressure action.

In this connection, a preferred embodiment of an apparatus according to the invention is characterized in that the pressure member is urged against the information carrier in the lower position of the pressure arm by an end portion of a spring-loaded arm, which is pivotably connected to the frame which carries the supporting means. The spring-loaded arm provides the possibility of operating the pressure member purely mechanically. Due to the arrangement of the spring loaded arm on the frame, vibrations and shocks exerted on the housing cannot reach the supporting means via the spring-loaded arm but are damped by the feet
provided beneath the frame.

A further preferred embodiment of an apparatus according to the invention is characterized in that two pivot pins arranged in line with each other are connected to the platform and receiving grooves or slots for receiving these pins are provided in the side walls of the drawer, which latter grooves or slots extend substantially parallel to the guiding grooves or slots of the platform and are open on the lower side so that the pins can move into and out of the receiving grooves or slots, while the receiving grooves or slots terminate on the upper side in cylindrically bent pivot surfaces which are engaged by the pins in an operative position if the drawer is at least substantially in the extended position, while in the operative position the platform is tiltable about these pins between a horizontal and a tilted position with respect to the drawer, in the extended position of the drawer the platform being in the tilted position and control means being provided which control the tilting movement of the platform during the beginning of the inward movement and during the end of the outward movement, respectively, of the drawer. Thus, the platform is brought into a favourable position by tilting always before the information carrier is arranged or removed, while this positioning is effected during the continuous sliding movement of the drawer. Such a tilted position of the platform may be advantageous, for example, if the information carrier is located in a cassette. The pivot pins can slide during the first part of the inward movement over the horizontally arranged surface of the positioning element and can hold the platform in the upper position. The receiving grooves or slots for the pivot pins are constructed so that they do not cause difficulties when the platform is guided downwards to the supporting means. In connection with the foregoing, a favourable embodiment is characterized in that a pair of forward grooves or slots of the guiding grooves or slots of the platform in the side walls of the drawer, viewed in the inward direction, are each in open communication on the upper side with a first guiding groove or lost of the platform, which has a form concentrically bent about the pivot surface and, viewed with respect to the inward direction of the drawer, is located before the pivot surface. Thus, a combined guiding and control groove or slot is obtained, which combination provides a control of the platform both during the tilting and during the lowering of the platform.

A further preferred embodiment of an apparatus is characterized in that the drawer has an enclosure surface by which the information carrier can be positioned in the horizontal position during the inward and outward movement of the drawer with respect to the platform. By means of the enclosure surface, the information carrier is held in the correct position with respect to the platform during the sliding movement of the drawer so that the lowering towards the supporting means is effected from the desired starting position.

A guide of simple construction for the platform and the pressure arm is obtained if all grooves or slots are formed in the inner sides of the two side walls of the drawer. A construction, in which the width of the drawer and hence also of the front opening can remain limited, is characterized in that the guiding grooves or slots for the platform are formed in the inner sides of the side walls of the drawer and the grooves or slots for the pressure arm are formed in the outer sides of the side walls of the drawer.

BRIEF DESCRIPTION OF THE DRAWING

FIG. 5 is a diagrammatic side elevation of a second embodiment of an apparatus according to the invention, constituted by a record player, in which the drawer is fully extended;

FIG. 6 is a diagrammatic side elevation of the apparatus fo FIG. 5, in which the drawer is fully inserted;

FIG. 8 is a diagrammatic side elevation of a fourth embodiment of an apparatus according to the invention, constituted by a magnetic tape cassette apparatus, in which the drawer is in the extended position, during the step of placing a cassette with the information carrier on the platform or removing it therefrom, respectively;

FIG. 9 is a diagrammatic side elevation of the magnetic tape cassette apparatus shown in FIG. 8, in which the drawer is in the first part of the inward movement;

FIG. 10 is a diagrammatic side elevation of the magnetic tape cassette apparatus shown in FIG. 8, in which the drawer is at the end of the first part of the inward movement and FIG. 11 is a diagrammatic side elevation of the magnetic tape cassette apparatus shown in FIG. 8, in which the drawer is fully inserted.

DETAILED DESCRIPTION OF THE INVENTION

Figure 1:
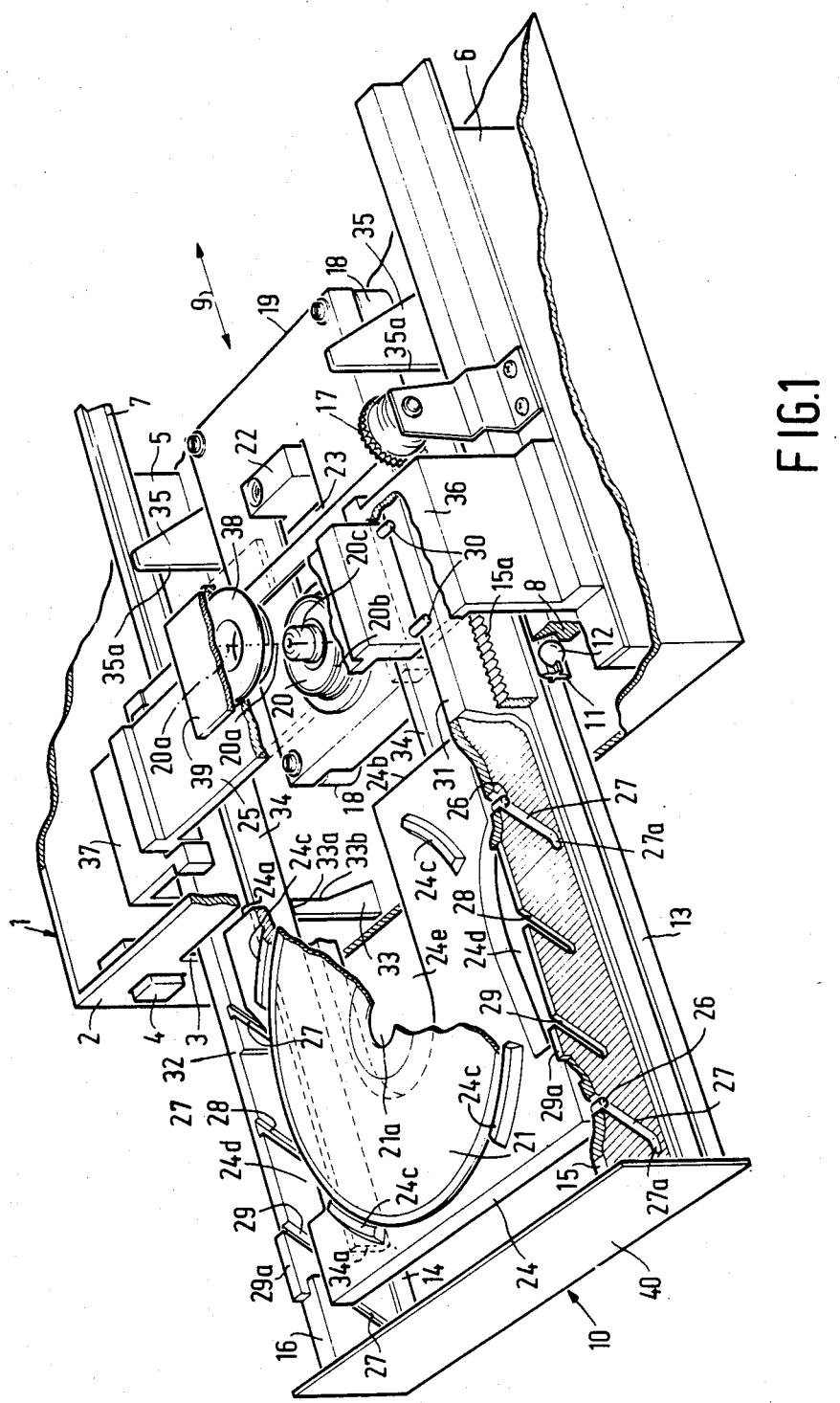
FIG. 1 is a partly cut-away perspective view of a first embodiment of an apparatus according to the invention constituted by a record player, showing the drawer in the extended position.

An apparatus for recording and/or reproducing signals on an information carrier is constituted in the embodiment shown in FIG. 1 by a record player, which comprises a housing 1 with a front wall 2 in which are provided a front opening 3 and a control push-button 4. The housing 1 accommodates two parallel elongate supports 5 and 6 on which are secured rails 7 and 8, respectively, along which a drawer 10 is rectilinearly movable in the direction of a double arrow 9. The drawer is movably supported on the rails 7 and 8 by means of balls 12 mounted in elongate carriers 11. The drawer 10 is provided near its lower side with profiles 13 and 14 for co-operation with the carriers 11 and balls 12. Above the profiles 13 and 14 the drawer 10 has upright side walls 15 and 16, respectively. The side wall 15 comprises a part 15a which, over a certain length is formed as a toothed rack extending in the direction of the arrow 9 with which a toothed pinion 17 cooperates in the inward and outward movements of the drawer 10. The pinion 17 may be connected to an electric motor (not shown) for automatically producing the inward and outward movements. In another embodiment, in which there is arranged between the drawer and the front side of the housing a tension spring (not shown) which is stretched during the inward movement of the drawer, the pinion 17 forms part of a damping coupling for damping the outward movement of the drawer, the push-button 4 being coupled to a locking device which locks the drawer in the inserted position so that the outward movement of the drawer 10 (see FIG. 4) is performed when the push-button 4 is depressed. If the drawer is moved by means of an electric motor, the push-button 4 is used to control the electric motor circuit for starting the inward and outward movement of the drawer.

The housing 1 accommodates four rubber feet 18 which carry a frame 19 in a manner such that vibrations imparted to the housing are not transmitted to the frame 19 but are damped by the rubber feet 18. Supporting means constituted by a turntable 20, are journalled in the frame 19 so as to be rotatable about an axis 20a which extends at least substantially at right angles to the direction of movement of the drawer 10. The turntable 20 is coupled below the frame 19 to a driving motor (not shown) and has at its circumference a rim 20b concentric with the axis 20a for supporting a record disc 21. The turntable 20 also comprises a centering cone 20c, the lower part of which has a diameter which is approximately equal to the diameter of the central hole 21a of the disc 21. An optical read head 22 is movably arranged on the frame 19 so as to be movable in a radial direction with respect to the axis 20a. The read head 22 operates to read optically information carried on a disc 21 during rotation of the disc on the turntable 20. During operation, the read head 22 moves in an outward radial direction in an elongate opening 23 provided in the frame 19.

The drawer 10 forms part of a loading mechanism for loading a disc 21 onto the turntable, of which loading mechanism not only the drawer but also a platform 24 and a beam-like pressure arm 25 may form part. The platform 24 is supported into the drawer by pins 26 which project from the platform and engage slidably in guiding grooves 27 in the inner side of the side walls 15 and 16 of the drawer so that the platform is movable in downward and upward directions relative to the drawer. The side walls may be formed with slots instead of the grooves 27. The main parts of the grooves or slots extend obliquely upwards in the inward direction of the drawer i.e. from the front of the drawer. Each of the side walls 15 and 16 also has grooves 28 and 29 in its inner side which extend approximately parallel to the main parts of the grooves 27 and in which pins 30 on the ends of the pressure arm 25 can slidably engage. It should be noted that the forward pins 30 on the pressure arm 25, which pins are co-operable with the grooves 29, are made slightly longer than the rearward pins 30, and the grooves 29 are made correspondingly deeper than the grooves 28, so that during the inward and outward movements of the drawer the forward pins 30 will pass over the open upper ends of the grooves 28 and will not enter these grooves. In the position of the drawer shown in FIGS. 1 and 2 the pins 30 bear on straight-line guides 31 and 32 constituted by the upper edges of the side walls 15 and 16, respectively. Near the front of the drawer the straight-line guides 31 and 32 adjoin raised portions 29a on the upper edges of the side walls 15 and 16, which raised portions after a first part of the inward movement of the drawer has been completed, cause the projections on the pressure arm which are constituted by the pins 30 to enter the grooves 28 and 29 during a second part of the inward movement (see FIG. 3). Thus, the pins 30 on the pressure arm 25 are kept at an upper level during the first part of the inward movement of the drawer by means of the straight-line guides 31 and 32 acting as positioning elements. Positioning elements are also provided for keeping the platform 24 at an upper level during the first part of the inward movement of the drawer 10. These positioning elements are constituted by horizontal surfaces 33a at the tops of two upright supports 33 which are fixedly secured in the housing 1 (only one of the supports 33 is visible in FIG. 1). On its lower side the platform 24 has two parallel bars 34 fixed thereto which slide on the top surfaces 33a of the supports 33 during the first part of the inward movement of the drawer. The bars 34 extend beyond the rear side of the platform 24, while the front ends of the bars 34 are located a short distance to the rear of the front side of the platform 24. Each of the supports 33 also has an upright abutment surface 33b which adjoins the horizontal top surface 33a and which extends substantially parallel to the axis of the turntable and up which the front end surface 34a of the respective bar 34 slides during a first part of the outward movement of the drawer 10.

The housing 1 further accommodates two fixedly arranged stops 35 with abutment surfaces 35a which also extend substantially parallel to the axis of the turntable 20. During the second part of the inward movement of the drawer, portions 24a and 24b of the rear edge of the platform 24 slide down the abutment surfaces 35a. The distance between the abutment surfaces 33b and 35a is substantially equal to the distance between the front end surfaces 34a of the bars 34 on the platform 24 and the rear edge portions 24a and 24b, respectively, of the platform, measured parallel to the arrow 9, so that it is possible for the platform to move up and down without hindrance between the abutment surfaces 33b and 35a.

The pressure arm 25 is guided at its ends between the limbs of two bifurcated guides 36 and 37 which are fixedly arranged on the supports 6 and 5, respectively. Due to the presence of the guides 36 and 37, the pressure arm moves in a direction substantially parallel to the axis of the turntable 20 when the pins 30 slide in the grooves 28 and 29. The pressure arm 25 carries an annular pressure member 38, above which a cover 39 is arranged with clearance so that the pressure member 38 has a certain freedom of axial movement between the arm 25 and the cover 39. In this embodiment, the pressure member 38 is made of magnetic material, as a result of which the pressure member 38, in the lower position of the pressure arm, exerts a force on the disc on the turntable to urge the disc against the discsupporting rim 20b of the turntable 20.

Figure 4:
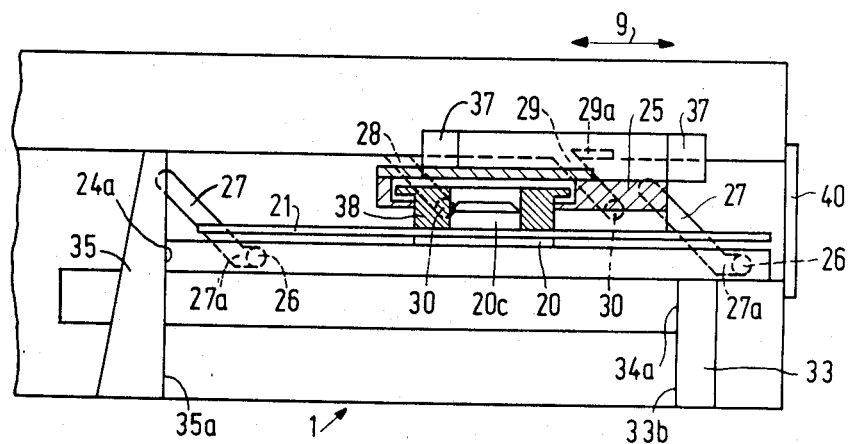
FIG. 4 is a diagrammatic side elevation of the apparatus, in which the drawer is fully inserted.

In the inserted position of the drawer 10, the front opening 3 of the housing is covered by a substantially rectangular covering plate 40 (see also FIG. 4).

Figure 2:
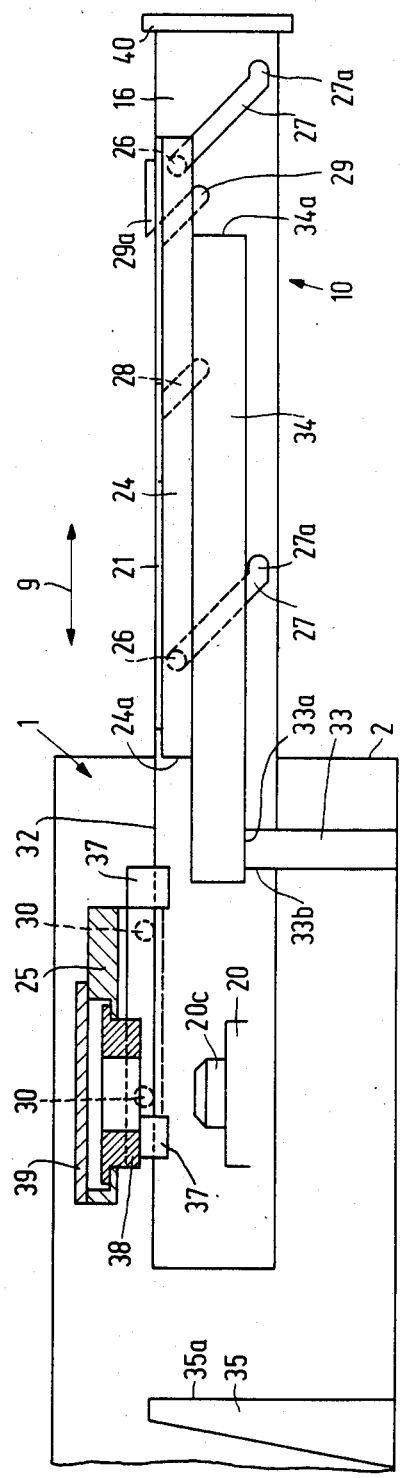
FIG. 2 is a diagrammatic side elevation of the apparatus, drawn to a reduced scale, again showing the drawer in the extended position.
Figure 3:
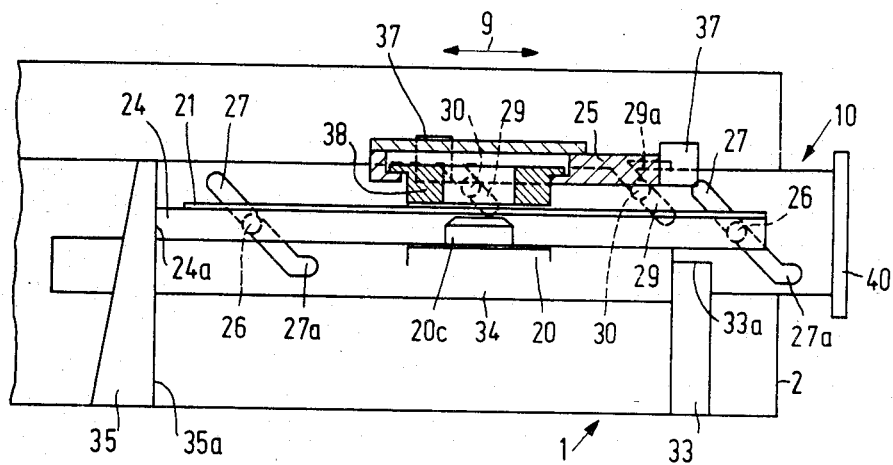
FIG. 3 is a diagrammatic side elevation of the apparatus, in which the drawer is partly inserted.

The operation of the loading mechanism described above is as follows:

In the extended position of the drawer 10 shown in FIGS. 1 and 2, a disc 21 is placed between arcuate disc-positioning ridges 24c on the upper side of the platform 24. To facilitate the placing of the disc between the ridges, and also a centering the disc on the platform, the ridges 24c are preferably provided with slightly sloping inner walls. In the embodiment shown, four ridges 24c are provided at regular intervals around the disc-supporting area of the upper side of the platform. Recesses 24d are provided in the two side edges of the platform to enable the disc to be held without difficulty at its edge between a thumb and finger, when it is being placed on the platform 24. Consequently, the disc need not be gripped with the fingers on the information-carrying part of the disc so that no fingerprints are left on this part of the disc which is beneficial for the reproduction quality of the disc 21. When the disc has been placed on the platform 24 the drawer 10 can be retracted. In this starting position, the pins 26 on the platform are located in an upper position at the upper ends of the grooves 27 in the side walls of the drawer and the bars 34 on the platform bear on the horizontal top surfaces 33a of the supports 33. Thus, the platform is positioned at the upper level and the pins 26 cannot slide down the grooves 27. The pins 30 on the pressure arm 25 bear on the straight-line guides 31 and 32 on the side walls of the drawer and the pressure arm is thereby retained in the upper position. Due to the positioning of the platform 24 at the correct level during the inward movement of the drawer, it is ensured that the disc 21 on the platform moves without hindrance over the centering cone 20c on the turntable 21, whilst the positioning of the pressure member 38 at the upper level prevents the disc from colliding with the pressure member. As already stated, the drawer 10 can be retracted by means of a motor through the pinion 17 and toothed rack 15a. The motor can be brought into operation in the present embodiment by pressing the push-button 4, which results in the motor circuit being closed. The first part of the inward movement of the drawer terminates at the instant at which the rear edge portions 24a, 24b of the platform 24 abut the abutment surfaces 35a of the stops 35. Due to the distance between the abutment surfaces 33b and 35a, at this instant the positioning of the platform at the upper level by the supports 33 is interrupted. Now the second part of the inward movement of the drawer 10 begins. As the drawer 10 continues its inward movement the platform 24 moves downwards due to the sliding engagement of the pins 26 in the oblique grooves 27, the rear edge portions 24a and 24b of the platform sliding down the abutment surfaces 35a. Due to the direction of the surfaces 35a, this movement of the platform is performed in a direction substantially parallel to the axis of the turntable 20. The arrangement of the abutment surfaces 35a is such that at this stage the disc 21 is located coaxially with the turntable 20. Simultaneously with the beginning of the second part of the inward movement of the drawer the forward pins 30 on the pressure arm 25 abut the raised portions 29a on the upper edges of the side walls 15, 16 of the drawer and are deflected thereby so that these pins and the rearward pins 30 on the pressure arm enter the grooves 29 and 28, respectively, in the side walls of the drawer. Due to the cooperation between these grooves and the pins 30, the pressure arm 25 also performs a downward movement similar to that of the platform 24 in a direction substantially parallel to the axis of the turntable 20, the arm 25 being guided in this movement by the bifurcated guides 36 and 37. The platform 24 is provided with a recess 24e (see FIG. 1), which is open in the rearward direction so that during both the first part and the second part of the inward movement of the drawer the platform is not impeded by the turntable 20 or the read head 22. During the second part of the inward movement the platform 24 moves down to a lower position in which its upper side is below the level of the upper side of the turntable 20. This position is reached when the pins 26 arrive in substantially horizontal parts 27a of the grooves 27 at the lower ends thereof. Due to the downward movement of the platform 24 the disc 21 is lowered onto the centering cone 20c and centered thereby with respect to the turntable 20. FIG. 3 indicates the instant at which the disc reaches the centering cone 20c. FIG. 4 indicates the situation in which the platform 24 has arrived at the lower position, leaving the disc 21 supported on the turntable and free from the platform 24. Due to the presence of the horizontal parts 27a of the grooves 27, the pins 30 on the pressure arm 24 can continue to slide down the grooves 28 and 29 for a short time after the platform 24 has reached its lower position, as a result of which, during the final part of the inward movement of the drawer 10 the pressure member 38 is brought into engagement with the disc 21 to urge it against the turntable (see FIG. 4). At this instant the drawer 10 reaches the fully inserted position at which point a switch (not shown) switches off the driving motor and the covering plate 40 on the drawer closes the front opening 3 of the housing 1. At the same time the drive of the turntable 20 is automatically started by means of a switch (not shown) and the process of playing the disc 21 by means of the read head 22 begins. During the rotation of the disc the pressure member 38 is free from the pressure arm 25 and the cover 39 due to the axial clearance and can rotate freely with the disc.

With a loading mechanism according to the invention the turntable and the read head can remain permanently inside the housing, as a result of which these parts are satisfactorily screened from the user. Thus, these comparatively sensitive parts are rendered less vulnerable to damage and further a good projection is obtained from the light beam emitted by the read head 22. Also, the process of wiring the turntable and the read head is facilitated. These advantages render the loading mechanism described particularly suitable for use in record players for playing optically readable discs of the "Compact Disc" type, in which the discs have to be loaded with great accuracy.

To start the outward movement of the drawer 10 the push-button 4 is pressed so that the motor is started again and a first part of the outward movement of the drawer begins. During this part of the outward movement of the drawer the front end surfaces 34a of the bars 34 on the platform 24 abut the abutment surfaces 33b of the supports 33. As a result, the pins 26 on the platform initially remain in the horizontal parts 27a of the grooves 27 in the side walls of the drawer. As a result of this the pins 30 on the pressure arm 25 move up the grooves 28 and 29 in advance of the movement of the pins 26 up the grooves 27, with the result that the pressure member 38 has already become disengaged from the disc 21 at the instant at which the platform begins to move from the lower position to the upper position and the disc 21 is lifted by the platform. After passing through the position shown in FIG. 3 the pins 26 reach the upper ends of the grooves 27 and the pins 30 move out of the grooves 28 and 29 onto the straight-line guides 31 and 32 on the side walls of the drawer. This marks the end of the first part of the outward movement of the drawer. The lower sides of the bars 34 on the platform 24 not bear on the horizontal top surfaces 33a of the supports 33 so that the platform is held at the upper level again and the pins 26 cannot slide back down the grooves 27. The second part of the outward movement of the drawer is then effected in the reverse manner to the first part of the inward movement. At the end of the outward movement of the drawer 10 the motor is again switched off by a switch (not shown) and the disc 21 can be removed from the platform 24. Again, the disc can be gripped between a thumb and finger inserted into the recesses 24 in the side edges of the platform.

In the embodiment of the apparatus according to the invention, again constituted by a record player, shown in FIGS. 5 and 6 parts which correspond to parts of the embodiment shown in FIGS. 1 to 4 are designated by like reference numerals. An essential difference in this embodiment is the presence of an arm 42 which is pivotable about a shaft 41 on the frame 19, which shaft extends horizontally at right angles to the direction of movement of the drawer 10. A spring 43 arranged between the arm 42 and the frame 19 urges the arm 42 towards the turntable 20. The pressure member, which in this embodiment is denoted by reference numeral 44, is not made of a magnetic material. Also it is not annular, as is the pressure member 38 in the preceding embodiment, but is closed at the top and is provided with a central protrusion 44a. The arm 42 lies about halfway between the stops 35. In the position shown in FIG. 5 the arm 42 has been pivoted upwards by the pressure arm 25 against the force of the spring 43. When the drawer 10 is inserted, the arm 42 will move downwards with the pressure arm 25 during the second part of the inward movement of the drawer. In this embodiment the cover 39 is omitted so that an end portion of the arm 42 can press against the central protrusion 44a on the pressure member 38 after the arm 42 has been pivoted slightly during the downward movement of the pressure arm 25. In the lower position of the pressure arm 25 the arm 42 pressure the disc 21 against the turntable 20. It is important that the arm 42 is arranged on the frame 19, so that when the disc is being played vibrations imparted to the housing 1 cannot be transmitted via the arm 42 to the turntable. In this embodiment also, such vibrations are damped by the rubber feet 18 on which the frame 19 is supported. In this embodiment the use of magnetic material for producing the force with which the pressure member presses the record disc against the turntable can be avoided, which may be advantageous because magnetic material may adversely affect the operation of the read head 22. Further, the possibility is thus obtained of determining the force of the pressure member by the choice of the spring 43.

Figure 7:
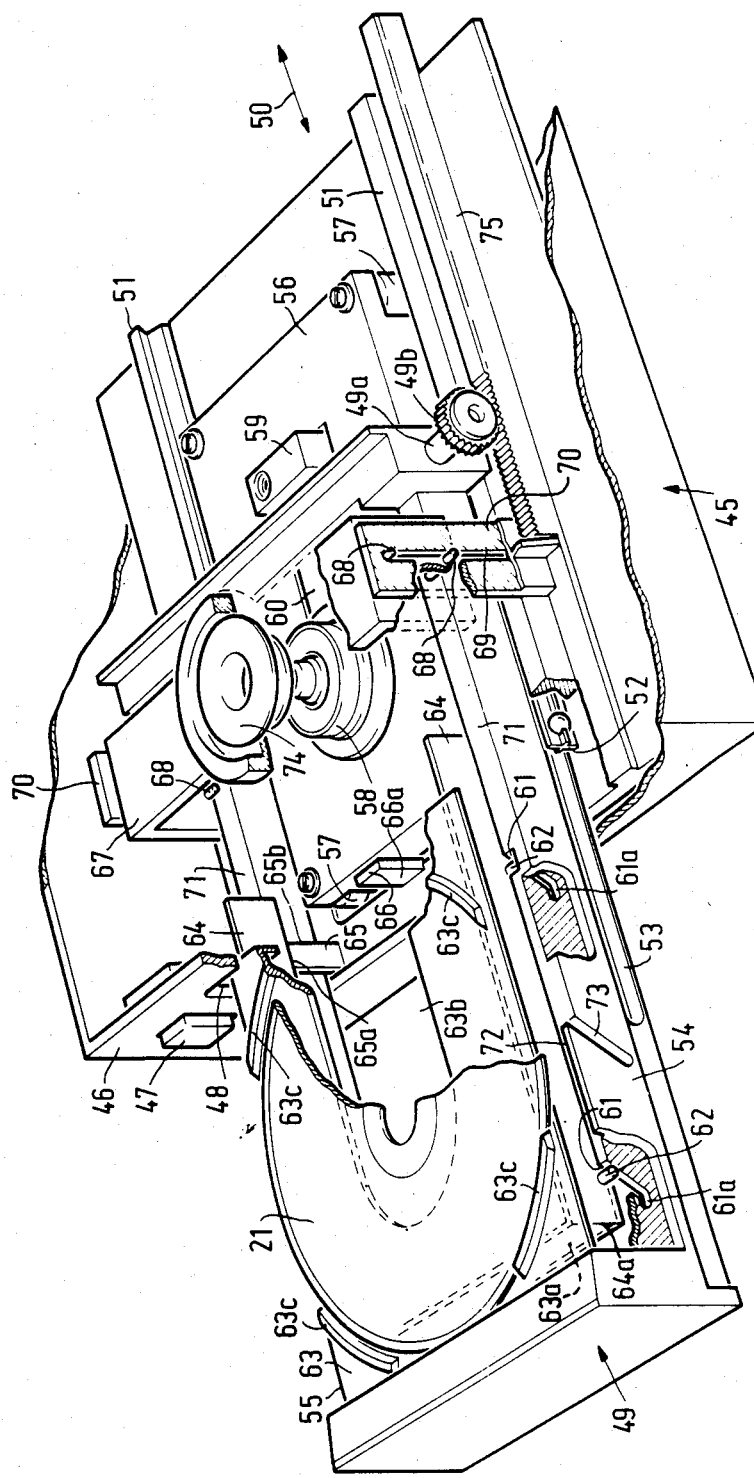
FIG. 7 is a partly cut-away perspective view of parts of a third embodiment of an apparatus according to the invention, constituted by a record player.

In the embodiment of the apparatus according to the invention, again constituted by a record player, shown in FIG. 7, the operation is essentially similar to that of the embodiment shown in FIG. 1. Also in this embodiment, a housing 45 with a front wall 46, a push-button 47 and a front opening 48 is provided. Through the opening 48 a drawer 49 is movable rectilinearly between an extended position shown in FIG. 7 and an inserted position not shown. Fixedly arranged in the housing 45 are two parallel rails 51 which co-operate with profiles 53 in the lower part of side walls 54 and 55 of the drawer 49 via balls mounted in elongate carriers 52. Also in this embodiment, a frame 56 is resiliently supported on four rubber feet 57 in the housing 1. The frame 56 supports supporting means for the disc 21 constituted by a turntable 58 which has a construction similar to that of the turntable 20, as well as an optical read head 59 which is movable in a radial direction with respect to the turntable in an opening 60 in the frame 56. The inner sides of the side walls 54 and 55 are provided with guiding grooves 61 which extend in a similar direction to the grooves 27 in the first embodiment and similarly terminate at their lower ends in substantially horizontal parts 61a. Again slots may be provided in the side walls 54 and 55 instead of the grooves 61. Engaging slidably in these grooves are pins 62 which project from a platform 63. The platform 63 is provided on its lower side with bars 64 which, like the bars 34 in the preceding embodiment, bear in the extended position of the drawer 10 on positioning elements constituted by horizontal surfaces 65a at the tops of two upright supports 65. The bars 64 have front end surfaces 64a which at the end of the first part of the inward movement of the drawer 49 pass the supports 65 so that the positioning action of the surfaces 65a of the supports is interrupted and the platform can move under the action of the grooves 61 on the pins 62 from the upper position to a lower position in a manner similar to that in which the platform 24 in the preceding embodiment performs its downward movement. Near the front of the housing 45 there is fixedly arranged in the housing a stop 66, which is provided with an upright abutment surface 66a. When the first part of the inward movement of the drawer 49 is completed, the rear side of an abutment member 63a which is secured to the lower side of the platform 63 near the front edge of the platform abuts the surface 66a. When the positioning action of the surfaces 65a of the supports 65 is interrupted, the pins 62 are forced during the continued inward movement of the drawer to slide down the grooves 61. This arrangement of one stop 66 with the abutment surface 66a also allows the platform 63 to have a smaller width at right angles to the direction of its movement since it is not, as in the first embodiment, to provide a stop at both sides of the frame 56. A further important reason why the width of the platform 63 can be reduced lies in the arrangement for guiding the pressure arm 67 in this embodiment. The latter is slidably guided at each end by means of two pins 68 which are arranged one above the other on the respective end of the arm and which slide in a groove 69 which extends substantially parallel to the axis of the table 58 in an upright guide 70 fixedly connected to the housing. The lower pins of the two pairs of pins 68 are extended inwardly so that during the first part of the inward movement of the drawer 49 these pins bear on straight-line guides 71 on the upper edges of the side walls 54 and 55 of the drawer. Near the front of the drawer these guides 71 adjoin raised portions 72 on the upper edges of the side walls 54 and 55, which portions, at the beginning of the second part of the inward movement of the drawer, deflect the lower pins 68 into oblique grooves 73 which are provided in the outer sides of the side walls 54 and 55. Slots may be provided in the side walls 54 and 55 instead of the grooves 73. As the lower pins 68 move down the grooves 73 during the second part of the inward movement of the drawer, the pressure arm 67 performs a downward movement in a direction substantially parallel to the axis of the turntable 58. When the pins 62 on the platform 63 have passed into the horizontal parts 61a of the grooves 61, the pressure member 74 on the pressure arm 67 can urge the disc 21 against the turntable during the last part of the inward movement of the drawer 49. In this embodiment also the platform 63 has a recess 63d which enables the platform to descend without hindrance to a position in which its upper side is below the level of the upper side of the turntable. The platform 63 has disc-positioning ridges 63c which are similar to the ridges 24c in the first embodiment. The drawer 49 is driven via a pinion 49b which is fixed on a shaft 49a on one side of the drawer and which meshes with a toothed rack 75 fixed on the bottom of the housing. To move the drawer 49 in and out a motor (not shown) rotates the pinion 49b which rolls along the toothed rack 75. Switches are provided which limit the inward and outward movements of the drawer by switching off the motor. It is also possible in this embodiment to arrange for the drawer to be moved inwards manually against the resistance of a spring (not shown) arranged between the drawer and the housing, and to be moved outwards by the spring in which case the pinion 49b may be provided with a damping coupling.

At the beginning of the first part of the outward movement of the drawer, the front end surfaces 64a of the bars 64 on the platform 63 abut surfaces 65b on the supports 65. In this embodiment also it is important that the distance, measured in the direction of the arrow 50, between the abutment surfaces 65b and the abutment surface 66a of the stop 66 is substantially equal to the distance between the rear side of the abutment member 63a and the front end surface 64a of the bars 64.

Due to the small width of the platform 63, which width is preferably smaller than the diameter of the disc 21, it is easier in this embodiment for the user to place a disc, held between thumb and finger, on the platform 63. In addition to the smaller width of the platform 63 in this embodiment, the construction shown has the further advantage that by guiding the pressure arm 67 by means of the two pins 68 in each of the grooves 69 it can be unsured that tilting of the pressure arm during its downward and upward movement cannot occur.

It should be noted that the construction shown in FIGS. 5 and 6 may also be used advantageously in the embodiment shown in FIG. 7. Due to the small width of the platform 63, the embodiment of FIG. 7 has a front opening 48 of small width, as a result of which there is more space available on the front wall 46 of the housing 45 for control push-buttons and other control members of the record player. Thus, the construction shown in FIG. 7 provides a loading mechanism which is particularly suitable for use in compact record players, such as record players arranged in motor cars. In the case of a movably arranged application of the record player, the platform 63 maybe provided with locking members, which lock the disc 21 on the platform 63 during the inward movement of the drawer and which are unlocked by fixedly arranged unlocking pins during the movement of the platform to the lower position. Thus, the advantage is obtained that disturbing influences, such as vibrations, cannot bring the disc out of the preliminarily centred position on the platform during the inward movement of the drawer.

The apparatus shown in FIGS. 8-11 is constituted by a magnetic tape cassette apparatus comprising a loading mechanism for loading a tape-shaped information carrier which is located in a cassette. Where in this description the term "information carrier" is used in this connection, this term is to be understood to mean a magnetic tape cassette as a unit because the magnetic tape cassette is inserted and extended as a unit. For this purpose, the loading mechanism shown in FIG. 8 comprises a drawer 76, which, like the drawer 10 in the first embodiment, is rectilinearly displaceable in the direction of a double arrow 77, is guided by longitudinal guides 78a in a housing 78 and moves over fixedly arranged supports 79 and 80. Also the drawer 76 comprises two upright side walls 81 in which guiding grooves 82 and 83 are located on the inner side, which are comparable with the grooves 27. The drawer 76 carries a cassette holder 84 into which a cassette 85 can be inserted, a platform 86 constituting a supporting surface for the cassette which is integral with the holder 84. The holder 84 carries pins 87 and 88 which can extend through the grooves 82 and 83. Further, two pivot pins 89 are arranged in line with each other on the holder 84, which pins engage in an operative position as shown in FIG. 8 pivot walls 90a which limit the upper end of receiving grooves 90 which extend parallel to the grooves 82 and 83. By means of the pins 89 and the walls 90a, the holder 84 is tiltable between a horizontal position with respect to the platform 86 (FIG. 9-11) and a tilted position (FIG. 8). In order to obtain a satisfactory guiding of this tilting movement about the pins 89, first and second guiding grooves 91 and 92, respectively, are provided in the side walls 81. Each groove 91 has an arcuate form concentric to the pivot wall 90a, being located, viewed in the inward direction of the drawer 76, beyond the wall 90a and being in open communication on the upper side with the guiding groove 83 so that the pin 87 located in the groove 91 can move without hindrance from the position shown in FIG. 8 via that shown in FIGS. 9 and 10 to that shown in FIG. 11 in the groove 83. Every second guiding groove 92 comprises an arcuate upper part 92a, which also engages concentrically the pivot wall 90a, while the part 92a, viewed in the inward direction, adjoins in front of the wall 90a a lower part 92b which extends parallel to the guiding grooves 82 and 83 and is open on the lower side in order to permit the unhindered passage of a pin 93 (see FIGS. 10 and 11) on the side wall 81 of the drawer 76, which during tilting moves towards the part 92a.

The holder 84 has in an upper wall 84 a recess 95 with a first abutment wall 95a and a second abutment wall 95b, which during tilting engage a fixedly arranged tilting cam 96 on the housing 78 and thus control together as control means the tilting movement of the holder during the beginning of the inward movement and the end of the outward movement, respectively, of the drawer 76. During tilting to the tilted position shown in FIG. 8, the ends of the guiding grooves 91 and 92 constitute limitations for the tilting movement together with an obliquely arranged upper wall 99a of the support 99 near the front side of the apparatus. The upper wall 99a in this position provides a support of the holder so that the pins 89 cannot move downwards with respect to the grooves 90. The magnetic tape cassette 85 can be readily retracted and extended, respectively, in the position of the holder 84 tilted through approximately 30° with respect to the drawer 76 in the direction of the double arrow 97 with the drawer 76 in the extended position shown in FIG. 8. A cam 98 on the platform 86 can displace during insertion a slide (not shown) on the lower side of the cassette in backward direction, as a result of which driving openings of the cassette, which after the insertion are located above the passage opening 86a of the platform, are uncovered. Further, the cam 98 can constitute a limitation for the insertion of the cassette into the holder 84.

At the beginning of the manually performed inward movement of the drawer 76, the abutment wall 95a is urged against the tilting cam 96 located in the recess 95, which results in a tilting movement of the holder 84 about the pins 89 to the horizontal position shown in FIG. 9. Meanwhile, the pins 87 have arrived in the upper ends of the arcuate grooves 91 at the area at which these grooves adjoin the grooves 83, an accurate positioning of the pins 87 with respect to the grooves 83 then being obtained in that the pins 93 are moved into the lower parts 92b of the grooves 92. Immediately at the beginning of the inward movement, the pins 89 are moved over the horizontally arranged wall 79a of the supports 79. Thus, the supports 79 each constitute a positioning element for the platform 86 comparable with the supports 33 in the first embodiment, which element holds the platform 86 with the pins 87 and 88 in the upper position with respect to the guiding grooves 82 and 83.

After tilting, the cassette 85 is enclosed on the righthand side behind an upright wall portion 100a of an enclosure wall 100 and thus occupies an accurately defined position with respect to the platform 86.

A further inward movement of the drawer 76 results in that the lefthand side of the platform 86 abuts against an abutment wall 101a of a fixedly arranged abutment stop 101 (see FIG. 10). The abutment stop is comparable with the abutment stop 35 in the first embodiment. At this instant, the pins 89 have passed the lefthand end of the horizontally arranged wall 79a and the first part of the inward movement of the drawer 76 passes into the second part. Now, during the continued inward movement of the drawer, the platform is lowered in that the pins 87 and 88 slide in downward direction through the grooves 83 and 82, respectively, due to the vertical arrangement of the abutment wall 101a in a direction at right angles to the upper surface 102 of supporting means determined by the upper walls of fixedly arranged supports 103. Near the end of the inward movement due to the fact that the supports 103 move through openings in the platform 86, the cassette 85 is accurately centered on the supports 103 (FIG. 11) and is disengaged from the platform 86 and from the enclosure wall 100. Thus, in this position the platform is located beneath the upper surface 102. The lowering of the platform can also be utilized to pivot a front flap 85a of the cassette 85 by means of a fixedly arranged abutment stop into the opened position (FIG. 11). During lowering, the pins 89 and 93 leave the grooves 90 and 92, respectively. During lowering, the passage openings 86a are moved over driving shafts 104 of the apparatus, as a result of which the driving shafts are coupled to winding cores of the cassette. Like the grooves 27, the grooves 82 and 83 also have near the lower sides horizontal parts 82a and 83a, respectively, which extend over a short distance and into which the pins 88 and 87, respectively, move at the end of the inward movement.

The operation of recording and/or reproducing the signals on the magnetic tape can start after the magnetic tape has been pulled out of the cassette over a certain length and has been wound around a rotating head drum with magnetic heads. The process of unloading the magnetic tape cassette is effected in reverse order. In this case, the drawer is extended and the pins 89 slide along an abutment wall 79b, which adjoins the wall 79a and which is comparable with the wall 33b in the first embodiment. Ultimately, after the position shown in FIG. 9 has been reached, the abutment wall 95b abuts against the tilting cam 96 and the holder is tilted again to the position shown in FIG. 9, as a result of which the cassette 85 can be readily removed.

It should be noted that alternatively also in this embodiment the drawer 76 may be actuated by an electric motor. The embodiment of the loading mechanism shown in FIGS. 8–11 can be advantageously composed by injection-moulding of only three parts of synthetic material. Also this embodiment has the advantage of loading or unloading by merely displacing the drawer 76 in one continuous movement, whilst further a favourable tilted position of the platform is obtained in the extended position of the drawer.

Due to the fact that the information carrier is inserted in the horizontal position through a front opening in the housing, an apparatus according to one of the preceding embodiments is particularly suitable for use in a stacked assembly of audio and/or video equipment or in a space which is very limited in the vertical direction, for example, between two book-shelves.

What is claimed is:

1. Apparatus for recording or reproducing signals on an information carrier comprises:
   a housing having a front opening,
   a stop fixed in said housing and having an upright abutment surface facing said opening,
   a frame occupying a fixed position in said housing, said frame carrying supporting means for said information carrier,
   a drawer which is rectilinearly insertable and extensible on a horizontal path through said front opening between an extended and an inserted position, said drawer having side walls which parallel the direction of insertion, said side walls having respective mutually facing platform guide groove means therein, said groove means extending obliquely upward in the insertion direction,
   a positioning element fixed in said housing and having a horizontal surface parallel to the direction of insertion,
   a platform between the side walls for carrying the information carrier to the supporting means, said platform being movably arranged in the guide groove means to move it from an upper position to a lower position where said information carrier is located on said supporting means,
   the apparatus being arranged so that during a first part of insertion of the drawer the platform slides on the horizontal surface and is held thereby at the level of the upper position in the guide groove means until the platform slides off the horizontal surface and abuts the stop, whereupon during a second part of insertion the guide groove means moves the platform to the lower position while the abutment surface guides the platform in a direction substantially perpendicular to the supporting means.

2. An apparatus as in claim 1 further comprising a pressure member for urging the information carrier against the supporting means, said pressure member being located on a pressure arm which is movable perpendicularly to said support means, said pressure arm extending between said side walls above said platform, said side walls having respective pressure arm guide groove means which likewise extend obliquely upward in the insertion direction, said pressure arm cooperating with the pressure arm guide groove means only during the second part of insertion of the drawer to move the pressure member toward the supporting means.

3. An apparatus as in claim 2 wherein the pressure arm is provided with projections which cooperate with the pressure arm guide groove means to move the pressure member toward the supporting means.

4. An apparatus as in claim 1 characterized in that two pivot pins arranged in line with each other are connected to the platform and a pair of receiving groove means for receiving these pins are provided in the respective side walls of the drawer, which groove means extend substantially parallel to the guide groove means of the platform and are open on the lower side so that the pins can move into and out of the receiving groove means, while the receiving groove means terminate on the upper side in pivot surfaces which are engaged by the pins in an operative position if the drawer is at least substantially in the extended position, while in the operative position the platform is tiltable about these pins between a horizontal and a tilted position with respect to the drawer, in the extended position of the drawer the platform being in the tilted position and control means being provided, which control the tilting movement of the platform during the beginning of the inward movement and during the end of the outward movement, respectively, of the drawer.

5. An apparatus as in claim 4, wherein said platform guide groove means comprises a pair of first groove means located, viewed in the inward direction, beyond the pivot surfaces in respective side walls, said side walls further having a pair of first arcuate groove means in open communication with the upper ends of respective first groove means, said arcuate groove means being concentric to respective pivot surfaces.

6. An apparatus as claimed in claim 1, characterized in that the positioning element comprises besides the horizontal surface also an adjoining upright abutment surface which the platform abuts during a first part of the outward movement of the drawer, so that the platform is moved substantially perpendicular to the supporting means by cooperation with the guiding grooves or slots to the upper position, after which the platform during a second part of the outward movement of the drawer slides on the horizontal surface of the positioning element.

7. An apparatus as claimed in claim 6, characterized in that the distance between the abutment surfaces of the stop and the positioning element is substantially equal to the distance between the surfaces of the platform, with which the platform abuts these abutment surfaces, the distances being measured in directions parallel to the direction of the inward and outward movement of the drawer.

8. An apparatus as in claim 2 wherein the guide groove means for the pressure arm extend rectilinearly through their lengths and the guide groove means for the platform have parts at their lower ends which extend substantially parallel to the supporting means, the arrangement being such that when the platform cooperates with the lower end parts of the platform guide groove means during the first part of the outward movement and the second part of the inward movement of the drawer the pressure arm performs an upward movement and a downward movement respectively and the platform remains stationary.

9. An apparatus as in claim 3 wherein the side walls of the drawer are provided with straight-line guides adjoining said pressure arm guide groove means, said guides being arranged for cooperation with the said projections to keep the pressure arm in the upper position during the first part of the inward movement and the second part of the outward movement of the drawer.

10. An apparatus as in claim 2 wherein the pressure member is urged against the information carrier in the lower position of the pressure arm by an end portion of a spring-loaded arm which is pivotably connected to the frame, which carries the supporting means.

11. An apparatus as claimed in claim 10, characterized in that, when the pressure arm is moved upwards the spring-loaded arm urges against the upper side of the pressure arm and is pivoted upwards by the pressure arm.

12. An apparatus as claimed in claim 11, characterized in that the pressure member has a central protrusion against which the end portion of the spring-loaded arm urges in the lower position of the pressure arm.

13. An apparatus as claimed in claim 5, characterized in that the platform is further guided during the pivoting movement through a second groove means in each sidewall of the drawer, which second groove means has an arcuate upper part concentrically extending about the pivot surface.

14. An apparatus as claimed in claim 13, characterized in that the arcuate upper part of the second groove means viewed with respect to the inward direction of the drawer, adjoins forward of the pivot surface a lower part of this groove means, which lower part extends approximately parallel to the platform guide groove means.

15. An apparatus as in claim 4, characterized in that the platform is integral with a holder in which the information carrier is retracted and extended, respectively, in the extended position of the drawer, which holder has near the upperside a recess with a first and a second abutment surface which abut a fixedly arranged tilting cam during the beginning of the inward movement and the end of the outward movement, respectively, of the drawer, which recess and tilting cam together constitute the control means for controlling the tilting movement of the platform.

16. An apparatus as in claim 1 characterized in that the drawer has an enclosure surface by which the information carrier can be positioned in the horizontal position during the inward and outward movement of the drawer with respect to the platform.

17. An apparatus as in claim 2, characterized in that the pressure arm guide groove means are formed in the outer sides of the side walls of the drawer.

* * * * *